(12) United States Patent
Rasmussen (10) Patent No.: US 10,319,392 B2
(45) Date of Patent: Jun. 11, 2019

(54) HEADSET HAVING A MICROPHONE

(71) Applicant: GN AUDIO A/S, Ballerup (DK)

(72) Inventor: Erik Witthøfft Rasmussen, Charlottenlund (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 15/856,172

(22) Filed: Dec. 28, 2017

(65) Prior Publication Data

US 2018/0122400 A1 May 3, 2018

Related U.S. Application Data (63) Continuation of application No. 15/349,050, filed on Nov. 11, 2016, now abandoned, which is a (Continued)

(30) Foreign Application Priority Data

Jun. 28, 2013 (EP) .................................. 13174281

(51) Int. Cl.
 *H04R 1/08* (2006.01)
 *H04R 1/10* (2006.01)
 (Continued)

(52) U.S. Cl.
 CPC ........ *G10L 21/0232* (2013.01); *G10K 11/002* (2013.01); *G10L 15/20* (2013.01);
 (Continued)

(58) Field of Classification Search
 CPC ..... G10L 21/0232; G10L 25/21; G10L 25/78; G10L 2021/02166; G10L 15/20;
 (Continued)

(56) References Cited

U.S. PATENT DOCUMENTS 7,171,008 B2  1/2007 Elko
7,346,176 B1  3/2008 Bernardi et al.
(Continued)

FOREIGN PATENT DOCUMENTS

EP  2339868  6/2011
EP  2426950  3/2012

OTHER PUBLICATIONS

European Search Report for European patent application No. 13174281.9 dated Oct. 23, 2013.

*Primary Examiner* — Yogeshkumar Patel
(74) *Attorney, Agent, or Firm* — Altera Law Group, LLC (57) ABSTRACT

Noise cancelling headsets and a method of improving audio sensitivity for a headset are disclosed. The headset comprises a speaker, a microphone unit comprising at least a first and a second microphone for picking up incoming sound and generating a first audio signal generated at least partly from the at least first microphone and a second audio signal being at least partly generated from the at least second microphone, a signal processor being configured to receive and analyze the first audio signal and the second audio signal to determine one or more equalization filter coefficients, an equalization filter configured to receive the second audio signal and the one or more equalization coefficients, and to equalize the second audio signal according to the determined one or more equalization filter coefficients to provide an output audio signal, wherein the one or more equalization filter coefficient are determined so as to approximate a power spectrum of the output audio signal to a power spectrum of the first audio signal.

17 Claims, 8 Drawing Sheets

Related U.S. Application Data continuation of application No. 14/308,973, filed on Jun. 19, 2014, now abandoned.

(51) Int. Cl.

| | |
|---|---|
| H04R 3/00 | (2006.01) |
| G10K 11/00 | (2006.01) |
| G10L 15/20 | (2006.01) |
| G10L 25/21 | (2013.01) |
| G10L 25/78 | (2013.01) |
| G10L 21/0216 | (2013.01) |
| G10L 21/0232 | (2013.01) |

(52) U.S. Cl.
CPC .............. *G10L 25/21* (2013.01); *G10L 25/78* (2013.01); *H04R 1/083* (2013.01); *H04R 1/1083* (2013.01); *H04R 3/005* (2013.01); *G10L 2021/02166* (2013.01); *H04R 2460/01* (2013.01)

(58) Field of Classification Search
CPC ........ G10K 11/002; H04R 3/00; H04R 3/005; H04R 1/1083; H04R 2410/05; H04R 2460/01; H04R 1/083
USPC ....................... 381/94.7, 94.2, 73.1; 704/225
See application file for complete search history.

(56) References Cited

U.S. PATENT DOCUMENTS

| | | |
|---|---|---|
| 7,561,700 B1 | 7/2009 | Bernardi et al. |
| 2007/0088544 A1* | 4/2007 | Acero ................... G10L 21/02 704/226 |
| 2008/0037801 A1 | 2/2008 | Alves et al. |
| 2008/0260175 A1* | 10/2008 | Elko ....................... H04R 3/005 381/73.1 |
| 2010/0017205 A1 | 1/2010 | Visser |
| 2010/0296668 A1* | 11/2010 | Lee ....................... G10K 11/178 381/94.7 |
| 2013/0010982 A1* | 1/2013 | Elko ....................... H04R 3/005 381/94.2 |

* cited by examiner

HEADSET HAVING A MICROPHONE

FIELD OF THE INVENTION

The present invention relates to noise cancelling headsets and a method of improving audio sensitivity for a headset, by for example determining one or more equalization filter coefficients so as to approximate a power spectrum of the output audio signal to an optimum power spectrum even when the microphones are being mis-positioned with respect to an optimal positioning of the microphone in view of the acoustic source.

BACKGROUND

Headsets for communication are becoming increasingly used for voice communication and are used in all environments. Thus, the issue of reducing noise in the transmitted voice signal becomes increasingly relevant. Some headsets provide a boom for picking up acoustic sound, the boom may be a long boom for picking up sound directly at the user's mouth, others may have a short boom, or the boom may have an adjustable length. For all headsets, the issue of reducing noise while not reducing the signal quality is a challenge.

Especially for professional use, headsets having a boom with acoustic pickup near the source of the acoustic signal, such as near a user's mouth, have been provided. Typically, such microphones have a directional pattern tailored to receive an acoustic signal at a predetermined distance and under a well-defined angle. However, any mis-positioning of the boom with relation to the acoustic source will due to the directionality of the microphone typically lead to a reduced performance of the microphone, and thereby a reduced quality of the signal provided from the headset.

To ensure that the microphone is not mis-positioned by a user when the user is wearing the headset, the headset may be integrated with a cup provided to align a user's chin to the microphone. However, such as a cup is bulky and impractical and not comfortable for a user to wear for an extended period of time.

It is also known to lower the noise cancelling features of a microphone to allow for a better flexibility regarding the positioning of the microphones. However, this trade-off results in permanently reduced performance of the microphones, when in a noisy environment, and regardless of whether the microphone is mis-positioned or not.

Furthermore, in U.S. Pat. Nos. 7,561,700 and 7,346,176, a system and a method have been suggested to auto-adjust a noise cancelling microphone if the microphone is mis-positioned. In U.S. Pat. No. 7,561,700, it is determined whether the microphone is positioned incorrectly, and if this is the case, a polar response pattern of the microphone is adjusted and for example switched from a response, such as a figure-eight response, having noise cancelling features to an omnidirectional microphone. It is furthermore suggested to switch the directional response of a microphone between different directional response states, e.g. from a figure-eight response, to a hyper cardioid, cardioid and an omnidirectional response to provide an improved pick-up of the acoustic source depending on the severity of the mis-positioning.

However, also in these documents, the noise cancelling features are traded off to increase the pick-up sensitivity when the microphone is mis-positioned.

There is thus a need to provide a microphone which is capable of retaining noise cancelling features irrespective of a misplacement of the microphone in relation to an acoustic signal.

SUMMARY OF THE INVENTION

It is an object of the invention to improve voice sensitivity for a headset microphone.

According to one aspect of the invention, a headset for voice communication is provided, the headset comprising a speaker, a microphone unit comprising at least a first and a second microphone for picking up incoming sound and generating a first audio signal generated at least partly from the at least first microphone, and a second audio signal being at least partly generated from the at least second microphone. The headset further comprises a signal processor being configured to receive and analyse the first audio signal and the second audio signal to determine one or more equalization filter coefficients, and an equalization filter configured to receive the second audio signal and the one or more equalization filter coefficients, and to equalize the second audio signal according to the determined one or more equalization filter coefficients to provide an output audio signal. The one or more equalization filter coefficients may be determined so as to approximate a power spectrum of the output audio signal to a power spectrum of the first audio signal.

Alternatively, or additionally, the one or more equalization filter coefficients may be determined so that a ratio of the power spectrum of the output audio signal and the power spectrum of the first audio signal approximates a predetermined target ratio.

The signal processor may determine an equalization function $H_{eq}(f)$ by analysing the first audio signal and the second audio signal in a signal processor, and equalize the second audio signal according to the determined equalization function $H_{eq}(f)$ to provide an output audio signal. The output audio signal may have a frequency response corresponding to the first audio signal.

According to a further aspect of the invention a microphone system is provided, the microphone system comprising a microphone unit comprising at least first and second microphones for picking up incoming sound, and generating respective first and second audio signals, a first audio signal generated at least partly from the at least first microphone, and a second audio signal being at least partly generated from the at least second microphone. The headset further comprises a signal processor being configured to receive and analyse the first audio signal and the second audio signal to determine one or more equalization filter coefficients, and an equalization filter configured to receive the second audio signal and the one or more equalization filter coefficients, and to equalize the second audio signal according to the determined one or more equalization filter coefficients to provide an output audio signal.

The one or more equalization filter coefficients may be determined so as to approximate a power spectrum of the output audio signal to a power spectrum of the first audio signal.

According to a further aspect of the invention, a method of improving voice sensitivity for a headset is provided. The headset comprises a speaker and a microphone unit comprising at least a first and a second microphone, the method comprises generating at least first and second audio signals from the at least first and second microphones and processing the first and second audio signals so as to approximate a power spectrum of an output audio signal to a power spectrum of the first audio signal.

The method may furthermore comprise the steps of receiving an acoustic signal by the at least first and second microphones, generating a first audio signal and a second audio signal derived from the at least first and second microphones, analysing the first and second audio signals to determine one or more equalization filter coefficients and equalizing the second audio signal according to the determined one or more equalization filter coefficients to provide an output audio signal. The one or more equalization filter coefficients may be determined so as to approximate a power spectrum of the output audio signal to a power spectrum of the first audio signal.

Alternatively, or additionally, the method may comprise the step of determining a power ratio between the first audio signal and the second audio signal as a function of the frequency, and equalizing the second audio signal using the power ratio.

The headset may further comprise a boom, such as a microphone boom. The boom is typically a longitudinal arm and the boom may extend from the ear of a user and towards the mouth of a user. The boom may be a long boom for picking up sound directly at the user's mouth, the boom may be a short boom, or the boom may have an adjustable length.

The microphone boom may have openings connecting incoming audio to one or more microphones. The microphones may be provided in the microphone boom, or the headset may comprise a headphone or ear muff and the one or more microphones may be provided in the headphone. In the latter example, the microphone openings may be connected to the at least two microphones via sound tubes or channels, for example within the microphone boom. In some embodiments, the microphone boom has at least two microphone openings and the at least two microphone openings connect to the at least first and second microphones.

For headsets, the noise cancelling properties of the microphones are important properties, especially if the headset is used in a noisy environment, for example such as in an office environment or a call center environment. Therefore, the headset microphones are typically noise cancelling microphones. Noise cancelling microphones typically have reduced sensitivity to distant sounds, and increased sensitivity to sounds stemming from an acoustic source nearby. However, typically, the sensitivity is directional, so that the sensitivity is dependent on the positioning of the microphone with respect to the acoustic source, i.e. typically with respect to a user's mouth. Thereby, optimum sensitivity is achieved when the microphone, or microphone boom, is positioned correctly with respect to the acoustic source, and decreased sensitivity is experienced if the microphone, or microphone boom, is positioned off a preferred axis with respect to the acoustic source. Thus, the frequency response of the acoustic signal may degrade when the microphone is positioned off the preferred axis.

When a user wears a headset, typically, the microphone boom may be positioned with a certain flexibility to accommodate for example users having different head shapes and sizes, right and left ear use, etc. However, this also allows for mis-positioning of the microphone openings with respect to the user's mouth.

In some embodiments, the microphone(s), such as the at least first and second microphones, may be positioned in the microphone boom in acoustic communication with the microphone openings in the microphone boom. The microphone(s) may be electrically connected to other elements of the microphone unit which may be positioned outside the boom, such as in a headphone.

In some embodiments, the microphone boom may have microphone openings, and sound tubes or sound channels may be provided to guide the sound towards the microphone(s) which may be positioned in the headphone, thus the entire microphone assembly may be provided at the ear of a user. Thereby, the microphone openings may be connected to microphones, such as to the at least two microphones, via sound tubes or channels.

To obtain an acoustic output without or with reduced noise, typically one of the first and second microphones may be a noise reduced or noise cancelling microphone. In the present invention, the microphone unit may comprise a microphone which may be a noise cancelling microphone, such as a noise reduced microphone, etc. The microphone unit may comprise a directional microphone, and may comprise one or more active or passive noise filters.

A noise-cancelled microphone may also be provided by using two omnidirectional microphones and derive a directional response from first and second omnidirectional microphones.

Typically, a beam former is provided in the microphone unit and an output audio signal from the microphones, such as the first and second audio signals, may have any directivity pattern which may be derived from the at least two microphones, such as from two or more omnidirectional microphones, from at least an omnidirectional microphone and a directional microphone, etc.

The beam former may be a passive or an active beam former, and may use spatial filtering to obtain a desired output pattern.

Typically, a microphone unit comprises at least one microphone, such as at least a first and a second microphone, and the microphone unit may further comprise a beam former being configured to receive a microphone output signal, such as first and/or second microphone output signals, and output a beam formed signal, such as a first and/or second audio signal, respectively.

The microphone unit may comprise a plurality of microphones, and the beam former may receive the plurality of microphone output signals to form the desired beam, i.e. the desired polar pattern for the output beam. For example, a microphone unit may comprise a plurality of microphones and the beam former may receive a plurality of microphone output signals and generate an output beam formed signal, such as the first and/or second audio signal, generated as a weighted sum of audio signals from the plurality of microphones.

The headset may comprise an A/D converter for converting the analog audio signal to a digital audio signal for processing. The A/D converter may be provided in the microphone unit and may be configured to receive a microphone output signal, or if applicable, a beam formed signal and generate a digital output (beamformed) signal, such as the first and second audio signals, respectively. Alternatively, the A/D converter may be provided in the signal processor, and convert the signals immediately before the signal processing of the signals.

In some embodiments, the first microphone may exhibit an omni-directional frequency response, and/or the second microphone may exhibit a noise-cancelled frequency response.

Typically, the headset has a headphone, and the microphones, the beam former and/or the signal processor may be provided in the headphone.

The signal processor may be configured to receive at least the first audio signal generated from the at least first microphone, and the second audio signal may be at least partly generated from the at least second microphone. The signal processor may be an adaptation block.

In some embodiments the first and the second microphones exhibit different frequency responses, thus the polar pattern of the first and second microphones may be non-similar, so that the first microphone may exhibit a first frequency response, and the at least second microphone may exhibit a second frequency response.

The first audio signal may for example be derived from an omnidirectional microphone, and the second audio signal may for example be derived from either a noise-cancelled microphone, or from a plurality of microphones, wherein output from the plurality of microphones are fed to one or more beamformers to provide a beamformed audio signal having the characteristics of a directional microphone, or noise-cancelled microphone.

It has been found that if a boom having a noise cancelling microphone is placed sub-optimal with regards to an acoustic source, the noise cancelling microphone may retain its noise cancelling behaviour, that is regardless of microphone or boom placement. However, the voice pick-up sensitivity may be degraded by mis-positioning of the microphone or microphone boom, such as microphone openings in the boom. For example, the level of the acoustic signal, such as voice, may be reduced and also the frequency response of the acoustic signal may be degraded by the mis-positioning.

The signal processor may be configured to receive and analyse at least the first audio signal and the second audio signal to determine filter coefficients, such as equalization filter coefficients. A filter, such as a equalization filter, may be configured to receive the second audio signal and the filter coefficients, such as the equalization filter coefficients and to filter, or equalize, the second audio signal according to the determined filter coefficients, such as according to the determined equalization filter coefficients, to provide an output audio signal. The filter coefficients, such as the equalization filter coefficients, may be determined so as to approximate a power spectrum of the output audio signal to a power spectrum of the first audio signal. Alternatively, or additionally, the filter coefficients, such as the equalization filter coefficients, are determined so that a ratio of the power spectrum of the output audio signal and the power spectrum of the first audio signal approximates a predetermined target ratio.

The signal processor, or adaptation block, may be configured to adaptively determine the equalization filter coefficients. Thus, a feedback from for example the output audio signal, or a feedback from the filter may be provided to the signal processor so as to determine the filter coefficients adaptively.

The signal processor may furthermore be configured to analyse the incoming signals, such as the first audio signal and the second audio signal, to determine an equalization function $H_{eq}(f)$ as dependent on frequency for the at least first and second audio signals.

Thus, the signal processor may receive and analyse the incoming signals, such as the first and second signals. The analysis of the incoming signals may comprise determining signal correlations, such as cross correlation and autocorrelation of the incoming signal. The signal correlations may be performed in the time domain or the frequency domain or in the time-frequency domain. The analysis may be performed using any known transformation for analysing audio signals, such as for example a Fourier Transform, such as Fast Fourier Transform, Short-time Fourier transform, Discrete Fourier Transform, etc. The cross-correlation and autocorrelation of the incoming signals may establish the similarity of the signals. The equalization function $H_{eq}(f)$ may be an equalization function providing a frequency dependent filter function for the audio signals. The equalization filter may thus establish a frequency dependent gain, and for example apply a gain, such as a frequency dependent gain to the second audio signal and thereby amplify the second audio signal.

In one or more embodiments, the output audio signal has a flat frequency response such as a frequency response having limited variation in the relative response in dB over the frequency range in question, such as a variation of less than 1 dB, such as a variation of less than 3 dB.

The analysis may in some embodiments comprise determining a power ratio between the audio signals, such as a power ratio between the first audio signal and the second audio signal, as a function of the frequency and the processor may determine an equalization function as the power ratio or as a function of the power ratio.

The equalization function is typically provided to an equalization filter which is configured to receive the second audio signal and the equalization function $H_{eq}(f)$. The equalization filter equalizes the second audio signal according to the determined equalization function $H_{eq}(f)$. The output of the equalization filter, that is the output audio signal, may thereby obtain a frequency response corresponding to the first audio signal.

The equalization function may be determined as the ratio between the cross-correlation of the incoming audio signals, such as the cross-correlation of the first and second audio signals, and the autocorrelation of the second audio signal. The equalization function may be $H_{eq}(f)=S_{12}(f)/S_{22}(f)$, wherein $S_{12}$ denotes a cross-correlation of the first and second audio signals, $S_{22}$ denotes an autocorrelation of the second audio signal, and f is the frequency.

In one or more embodiments, the first audio signal may derived from an omnidirectional microphone assembly and the second audio signal may be derived from a noise cancelling microphone assembly, thus the first and second audio signal may be derived from a plurality of first, respective, second microphones to provide the desired polar pattern. In the present application, reference to a first microphone or a second microphone, may refer to one or more assemblies having one or more microphones.

Typically, the audio signal from the noise cancelling microphone is sensitive with regards to the placement of the microphone assembly in relation to the acoustic source, such as to a user's mouth, whereas an omnidirectional microphone is more tolerant with respect to the placement of the microphone, i.e. the microphone openings for the omnidirectional microphone, such as the placement of the microphone boom.

The second audio signal may retain the noise-reducing or noise-cancelling behaviour irrespective of the placement of the microphone, i.e. such as the placement of the microphone openings of the microphone. Thus, the noise-sensitivity of the second microphone, such as the noise-cancelling microphone may be retained even with a mis-positioning of the microphones, or the microphone boom. However, if the second microphone is mis-positioned, the audio or voice pick-up sensitivity may be reduced, so that the audio or voice level may be reduced, and furthermore also the frequency response of the audio or voice signal may be degraded by microphone mis-positioning.

By analysing the audio signals from the first and second microphones having an omnidirectional and a noise-cancelled response, respectively, for example in an adaptation block, a transfer function, such as a ratio between the first and second audio signals, may be determined. The second audio signal may be equalized using the transfer function to thereby yield a beam formed output which represent the noise-cancelling of a signal from a current (mis-)positioning of the noise-cancelling microphone assembly, such as microphone openings or microphone boom, and an audio or voice gain which corresponds substantially to the audio or voice gain of an optimally placed microphone, such as of the microphone openings or the microphone boom, of the omnidirectional microphone.

The signal processor may furthermore comprise a voice activity detector, VAD, configured to detect when a user is speaking, so that the voice activity detector may detect presence and absence of human speech.

A voice activity detection signal, VAD signal, may be generated from the first or the second audio signal indicating whether the user is talking into the headset microphone or not. The voice activity may be detected in any way as known by the person skilled in the art.

For example, the voice activity detection unit, such as a VAD block, may measure the power $P_1(t)$ of the first audio signal with a given time constant of e.g. 50 milliseconds, and the VAD signal may be generated as $$vad(t) = \text{true if } P_1(t) > P_{th}, \text{ false otherwise,}$$

where $P_{th}$ is a predetermined constant, corresponding to a predetermined power threshold.

In one or more embodiments, the signal processor is configured to analyse the first and second audio signals when it is detected, for example by the voice activity detector that a user is speaking.

In one or more embodiments, the audio signals may be further processed in the signal processor to thereby detect and provide an indication of a sub-optimally placed microphone, such as sub-optimally placed microphone openings or microphone boom. Furthermore, upon detection of the sub-optimally positioning, the audio signal may be compensated accordingly.

DETAILED DESCRIPTION OF THE DRAWING

Figure 1:
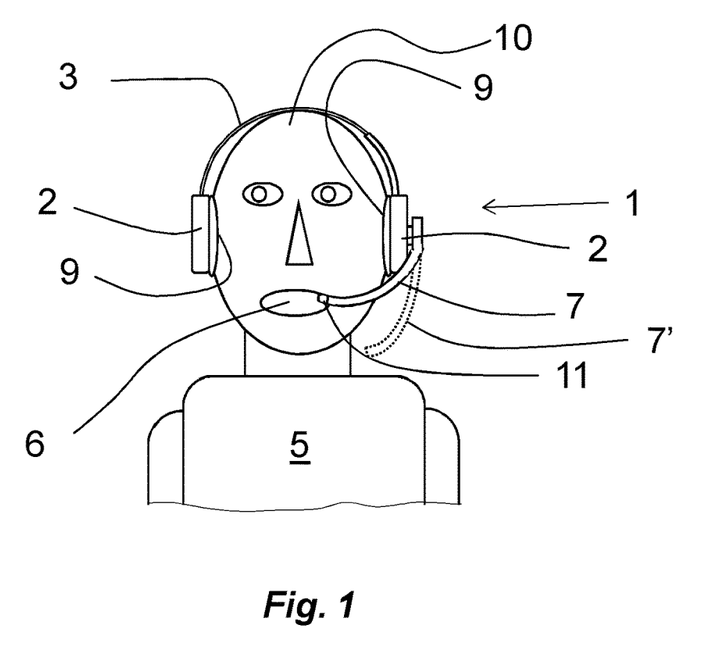
FIG. 1 shows a headset user wearing a headset with a microphone boom.

FIG. 1 shows a user 5 wearing an exemplary headset 1 for communication. The headset 1 shown is dual or binaural headset, having a headphone 2 at each ear, the two headphones 2 being interconnected through a headband 3, extending over the user's head 10, and a microphone boom 7. The headphones 2 each have an ear cushion 9 towards the ear 8 of a user.

Even though a dual headset 1 is shown in the figures, any headset style may be used, i.e. single and dual headphones, using headbands, neckbands, earhooks, and any combination thereof, etc., the headphones may be in-ear ear-bud style headphones, over-the-ear style headphones, etc., and the microphone may be provided in a microphone boom, in the headphone, as an in-line microphone, etc.

The headset 2 as shown has a microphone boom 7 for picking up acoustic sound, the microphone boom 7 as shown is a long microphone boom 7 for picking up sound directly at the user's mouth 6. Alternatively, the microphone boom 7 may be a short boom, or may it may have an adjustable length.

The microphone typically has been designed for an optimally placed position with relation to the acoustic source, in this case the mouth 6 of the user 5. It is an advantage of providing a microphone boom 7 with acoustic pickup near the source of the acoustic signal, such as near a user's mouth 6, as corresponding microphone may hereby be configured to receive the acoustic signal at a predetermined distance and under a well-defined angle and may typically have a directional polar pattern. However, any miss-positioning of the boom with relation to the acoustic source 6 will due to directionality of the microphone typically lead to a reduced performance of the microphone, and thereby a reduced quality of the signal provided from the headset 1. For example, the microphone boom 7' would be mis-positioned for a normal directional microphone and the acoustic signal would be distorted.

Figure 2:
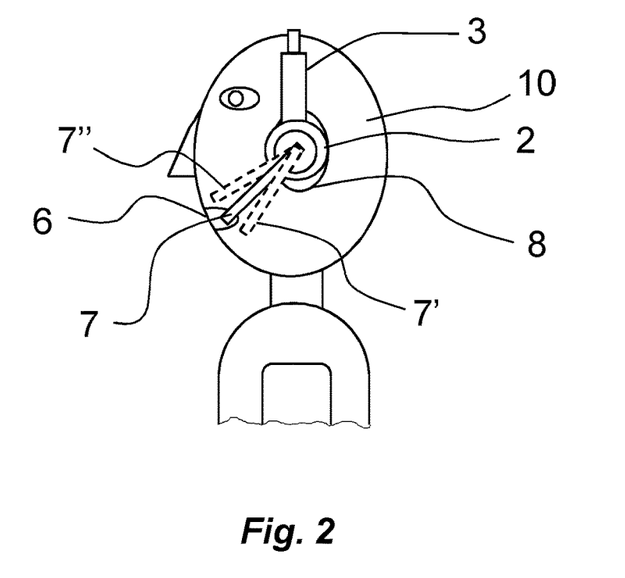
FIG. 2 shows a side view of a user wearing a headset.

In FIG. 2, the microphone boom 7 is shown in an optimally position with the acoustic pickup being right in front of the user's mouth 6, and angularly displaced microphone booms 7' and 7" are shown next to the user's mouth. It is an advantage of the present invention that the headset according to the invention is substantially insensitive to such minor misplacements of the acoustic pick-up.

Figure 3:
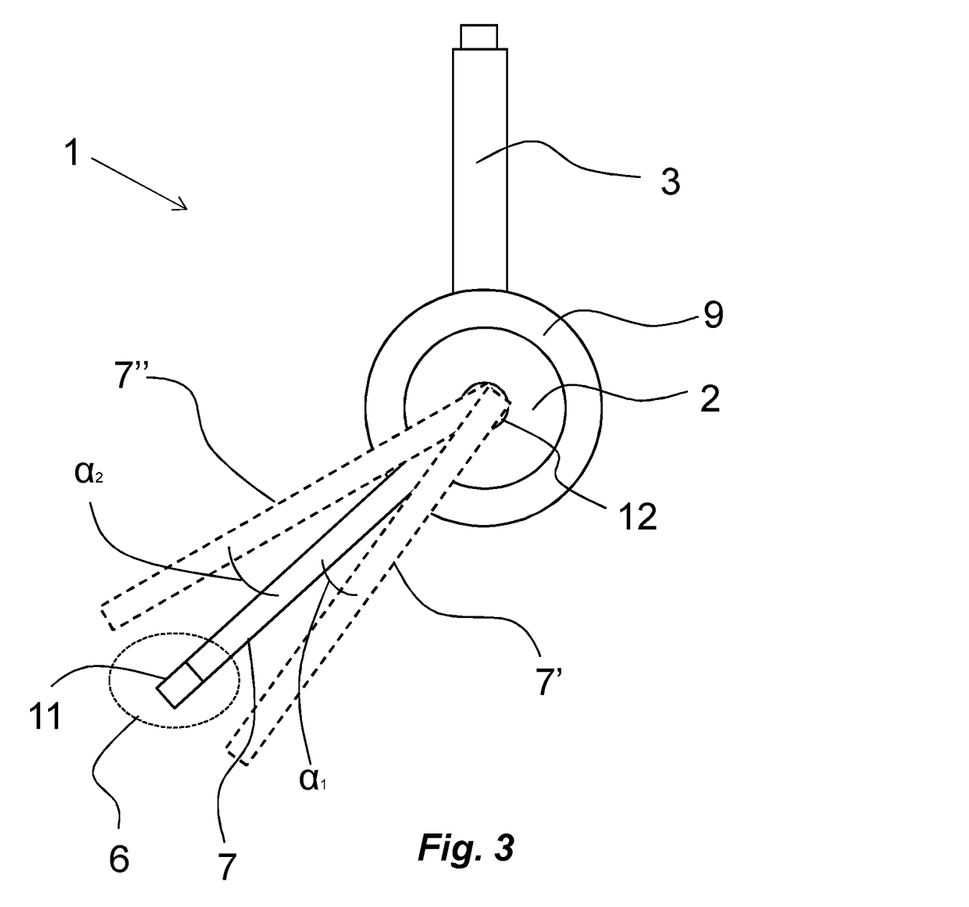
FIG. 3 shows a side view of a headset.

In FIG. 3, the headset is shown in more detail, and the microphone boom 7 is shown optimally positioned with the acoustic pick up area 11 positioned substantially in front of the acoustic source (not shown), that is at an optimum microphone position with respect to the acoustic source. The microphone booms 7' and 7" are angularly displaced from the optimum microphone position and it is an advantage of the present invention that the pick-up sensitivity for the microphones is substantially unchanged with an angular displacement, $\alpha_1$, $\alpha_2$, of up to 10°, such as up to 15°, such as up to 20°, or even up to 30°.

The microphone boom 7 may be mis-positioned regardless of the wearing style. The microphone boom 7 may for example be rotatable around a headphone hub 12, such as a headphone center, and the microphone boom 7 may be mis-positioned when the user 5 puts the headset 1 in place. Also, if the headset is mis-positioned when positioned on the user's head, the microphone boom may become askew.

Figure 4:
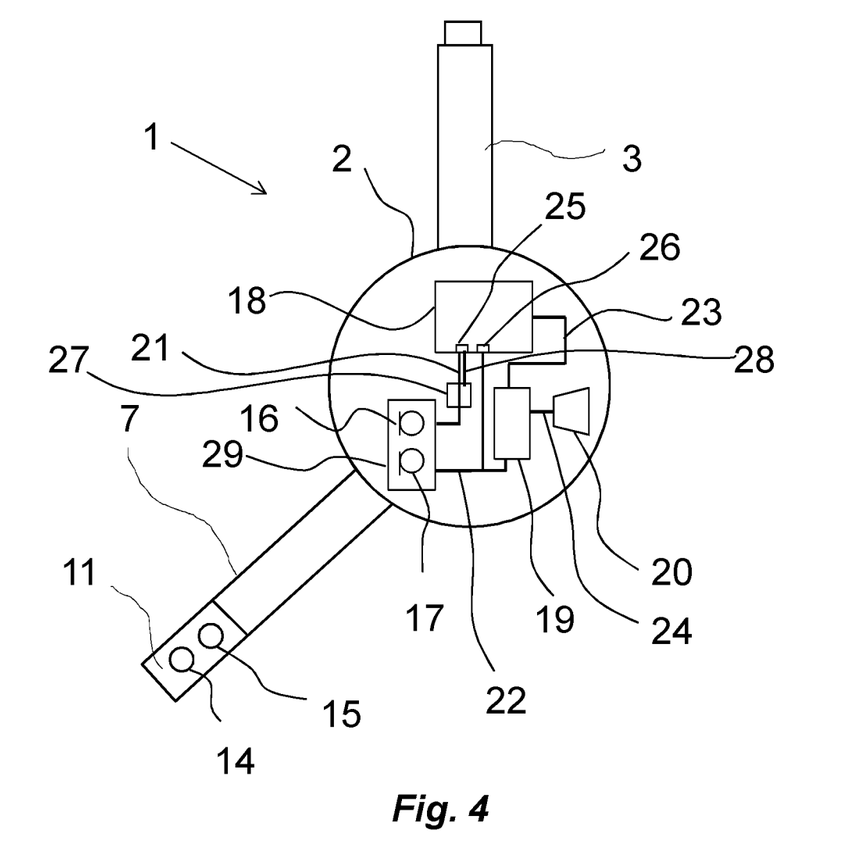
FIG. 4 shows another side view of a headset.

In FIG. 4, a side view of the headset 1 is shown schematically. The headphone 2 is seen from the inside, i.e. from the side which is usually provided towards a user's head or cheek.

In the microphone boom 7, a first acoustic pick up 14 and a second acoustic pick-up 15 are provided. The acoustic pick-up's 14, 15 are typically openings in the microphone boom, and the openings 14, 15 may be protected by a protective sheet, such as by a mesh or similar.

The microphones may be provided directly in the microphone boom 7 and be electrically connected (connections not shown) to the headphone 2 for processing, or the microphone boom 7 may comprise sound channels (not shown) for guiding the sound from the acoustic pick up 14, 15 to microphone(s) 16, 17 in the headphone 2.

The first and second microphones are provided in microphone unit 29, and the first and second microphones 16, 17 pick-up incoming sound, i.e. sound impinging on openings 14, 15, and the microphone unit 29 outputs first 21 and second 22 audio signals, respectively. The headset 2 further comprises a processor 18, such as a digital signal processor or adaptation block, being provided in the headphone 2 and configured to receive the first audio signal 21 generated from the at least first microphone opening 14, and the second audio signal 22 being at least partly generated from the at least second microphone opening 15.

The signal processor 18 is configured to receive the first audio signal 21 at first input port 25 and to receive the second audio signal at second input port 26 and to analyse the first audio signal 21 and the second audio signal 22 to determine an equalization function $H_{eq}(f)$ as a function of frequency. The equalization function $H_{eq}(f)$ 23 and the second audio signal 22 are provided to an equalizer 19 which equalizes the second audio signal 22 according to the determined equalization function $H_{eq}(f)$ 23. The output audio signal 24 from the equalizer 19 is in turn provided to speaker 20. It is an advantage of the present invention that the output audio signal typically has a frequency response corresponding to the frequency response of the first audio signal.

Figure 5:
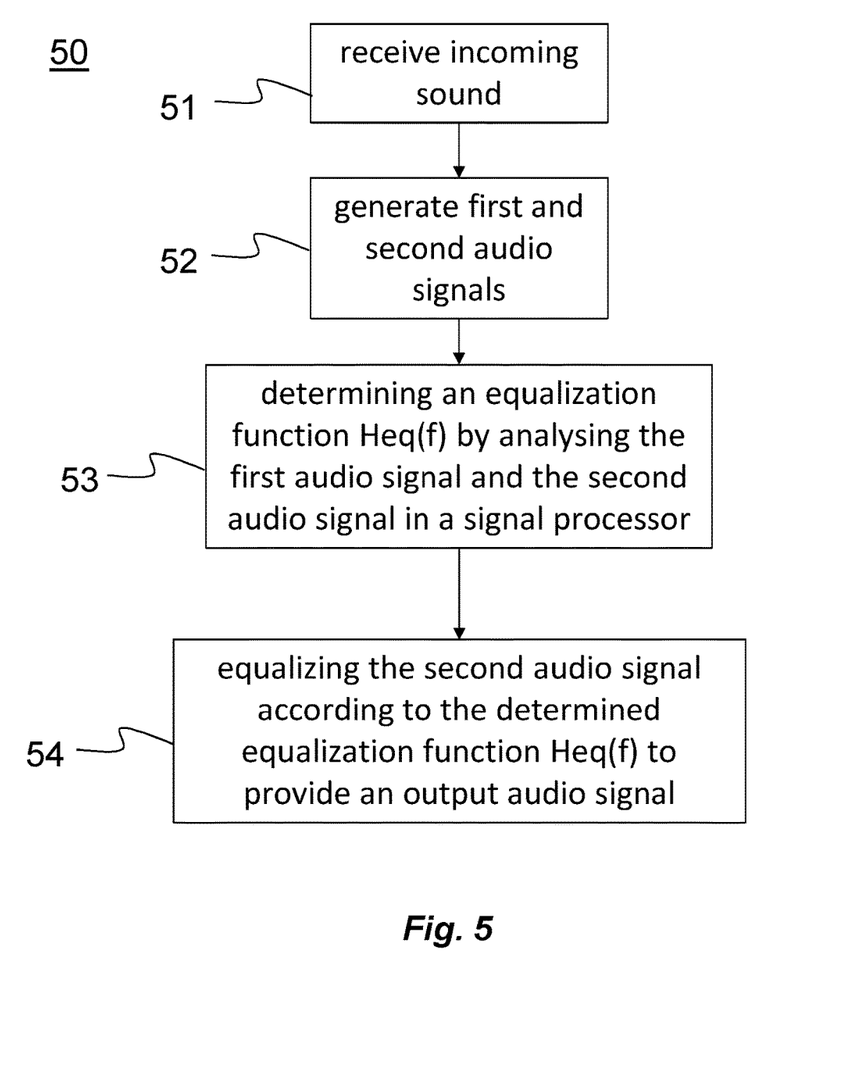
FIG. 5 shows a flow chart of a method according to the present invention.

In FIG. 5, a flow chart illustrating the method 50 of improving audio sensitivity according to the present invention is shown: In step 51, acoustic signals are received by the at least first and second microphones 16, 17, and in step 52, first and second audio signals are generated as derived from the at least first and second microphones 16, 17. In step 53, an equalization function $H_{eq}(f)$ is generated by analysing the first audio signal and the second audio signal in signal processor 18, where after in step 54, the second audio signal is equalized according to the determined equalization function $H_{eq}(f)$ to provide an output audio signal. The output audio signal may have a frequency response corresponding to the first audio signal. Preferably, the output audio signal has a flat frequency response.

Figure 6:
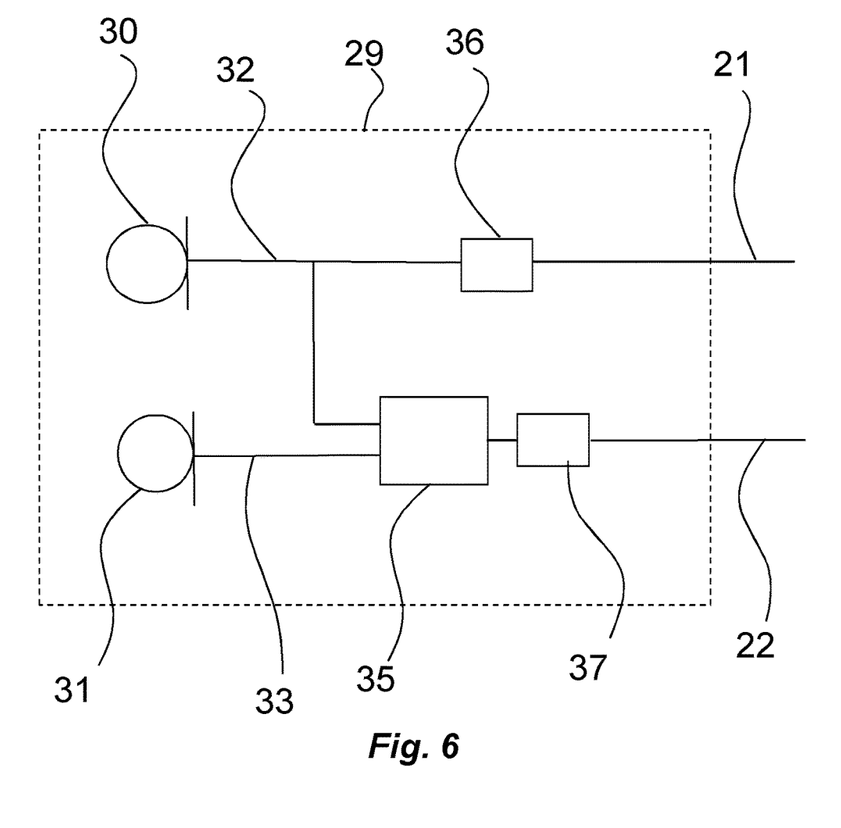
FIG. 6 shows schematically a microphone unit having two microphones.

FIG. 6 shows a microphone unit having at least first and second microphones 16, 17. The microphone unit 29 may comprises a first microphone 30 for receiving incoming sound and the first microphone 30 outputs a first microphone signal 32. The microphone unit 29 further comprises an A/D converter 36 for converting the analog first microphone signal to a digital audio signal, i.e. to the first audio signal.

The microphone unit 29 may further comprise a second microphone 31 for receiving incoming sound and the second microphone 31 outputs a second microphone signal 33. The second microphone signal as well as the first microphone signal from the first microphone are provided to a beam former 35. The beam former 35 outputs a second analog audio signal 32. The microphone unit 29 further comprises an A/D converter 37 for converting the second analog audio signal to a digital audio signal, i.e. to the second audio signal 22. It is envisaged that even though first and second A/D converters 36, 37 are shown in the microphone unit 29, the A/D converters could also be provided in the signal processor 18, so that analog audio signals are transmitted from the microphone unit 29 to the signal processor 18 for A/D conversion and analysis.

In the present embodiment, the first microphone and the second microphone are omnidirectional microphones. The first audio signal is derived from the first omnidirectional microphone, typically the frequency response for the omnidirectional microphone will be a flat frequency response, that is with limited variation in the relative response in dB over the frequency range in question, such as a variation of less than 1 dB, such as a variation of less than 3 dB.

To provide a directional microphone signal, the first microphone signal and the second microphone signal are provided to the beam former 35 and the second audio signal is derived from the beam formed output of the omnidirectional microphones 30, 31.

Figure 7A:
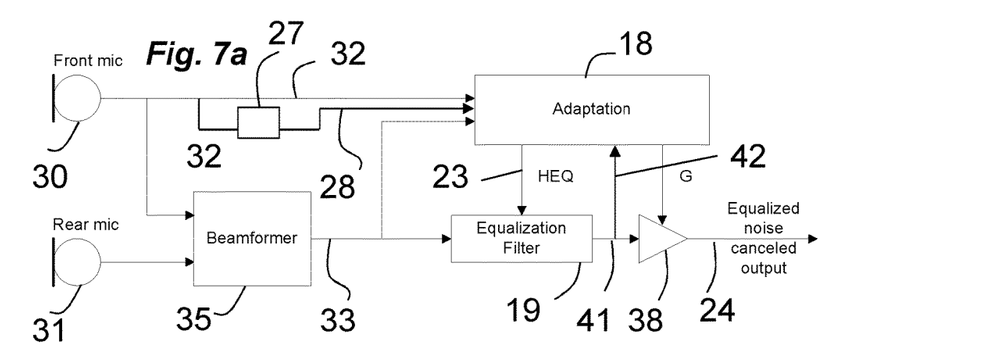
FIG. 7a-7c show embodiments of a microphone system according to the present invention.
Figure 7B:
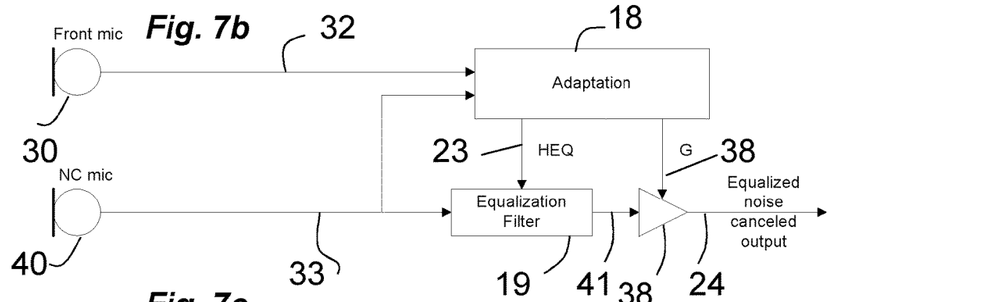
Figure 7C:
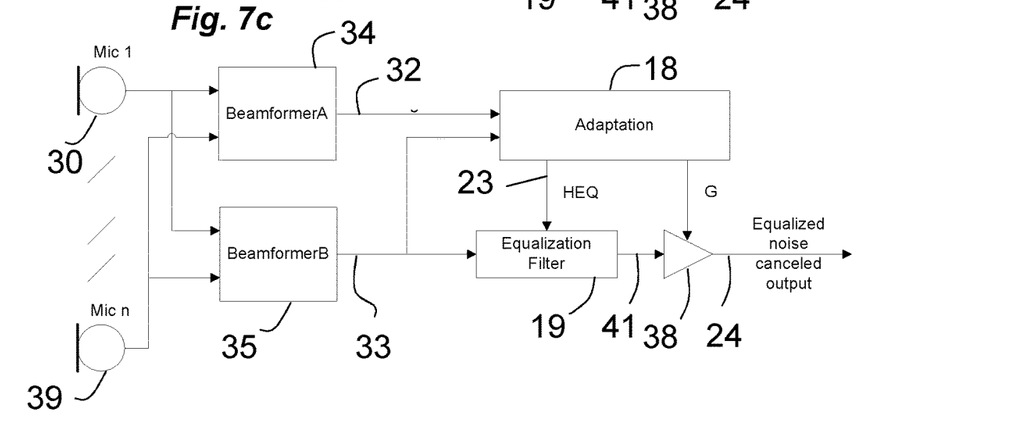

In FIG. 7a-c different system configurations, i.e. microphone signal processing system configurations for the headset, are shown.

In FIG. 7a, a microphone configuration corresponding to the microphones 16, 17 as shown in FIG. 6 is provided wherein two omnidirectional microphones receive the incoming audio. The first and second audio signal is provided to signal processor 18 and the transfer function $H_{eq}(f)$ is determined. A voice activity detector, VAD, 27 is provided between the microphone unit 29 and the signal processing. The VAD may be provided in either the first or second audio signal. In the present case the VAD receives at least a part of the first audio signal 32 and a VAD signal 28 is provided. The VAD signal 28 is true if voice is detected, and false otherwise. $H_{eq}(f)$ 23 and the second audio signal 33 is provided to equalization filter 19. The output 41 of the equalization filter 19 may optionally be fed back to the signal processor 18 to provide a feedback 42 to the signal processor 18, so as to provide an adaptive signal processing. Optionally, the signal processor may furthermore calculate a gain to compensate for the mis-positioning so that the output 41 of the equalization filter 19 is amplified by amplifier 38. The output signal is an equalized noise cancelled output 24.

In FIG. 7b, the system comprises a first microphone 30 and a second noise cancelled microphone 39. In this case the second microphone signal 33 is provided directly to the signal processor 18. Typically, the noise cancelled microphone is a directional microphone, such as a microphone having a directional polar pattern, such as a figure eight polar pattern or a cardioid polar pattern, etc. Typically, a noise cancelling microphone has a frequency response which varies with the frequency, and for example varies by 10-15 dB when the frequency ranges from $10^2$-$10^4$ Hz.

In FIG. 7c, the system comprises a plurality of microphones, 30, 39, up to n microphones. The system comprises beam formers to ensure that as well a beam having an omnidirectional polar pattern and a beam having a directional polar pattern are formed. The first audio signal 32 being derived from a beam having an omnidirectional polar pattern and the second audio signal 33 being derived from a beam having a directional polar pattern.

It is envisaged that even though VAD 27 and adaptive feedback 42 are only illustrated in FIG. 7a, these features may be applied to any of microphone setup.

Figure 8:
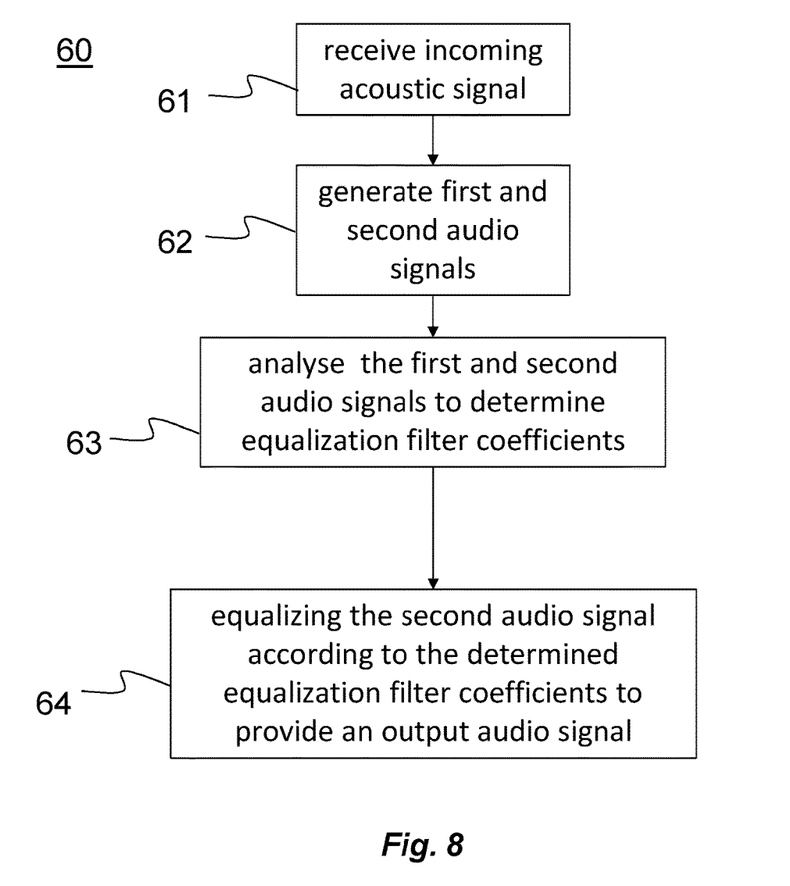
FIG. 8 shows a flow chart illustrating another method according to the present invention.

In FIG. 8, a flow chart illustrates another method according to the present invention. In the first step 61 an acoustic signal is received by the at least first and second microphones, and in step 62, a first audio signal and a second audio signal is generated as derived from the at least first and second microphones. The first and second audio signals are analysed to determine equalization filter coefficients in step 63, and in step 64, the second audio signal is equalized according to the determined equalization filter coefficients. Hereby, an output audio signal is provided wherein the power spectrum of the output audio signal approximates a power spectrum of the first audio signal.

It is envisaged that the filter coefficients may be determined in any way as known to a person skilled in the art. Thus, the filter coefficients may be determined from a transfer function using Fourier transform, least mean square, etc.

A person skilled in the art will appreciate that there are a number of possible methods for the determination of the one or more equalization filter coefficients, and below a few of these are briefly outlined.

For example, the signal processor 18, or adaptation block, may estimate the averaged power spectra $S11(f)$ and $S22(f)$ of the first and second audio signals, respectively. Typically, the estimation is only performed when voice activity is detected.

Thus, $S11(f,t)$ and $S22(f,t)$ may be determined as:

$$S11(f,t)=(\beta*S11(f,t-T)+(1-\beta)*P_1(f,t)) \text{ if } vad(t), S11(f,t-T) \text{ if not } vad(t)$$

$$S22(f,t)=(\beta*S22(f,t-T)+(1-\beta)*P_1(f,t)) \text{ if } vad(t), S22(f,t-T) \text{ if not } vad(t)$$

wherein vad(t) is the voice activity detection signal which is true if voice activity is detected and false if voice activity is not detected, $P_1(f,t)$ and $P_2(f,t)$ are the instantaneous power spectra of the first and second audio signals, respectively at time t and T is the interval between updates of S11 and S22.

The signal processor 18 may generate the equalization transfer function HEQ(f,t) as follows:

$$HEQ(f,t)=\text{sqrt}(S11(f,t)/S22(f,t))*H_{target}(f)$$

Where $H_{target}$ is a predetermined target response. The equalization filter coefficients may then be generated by an inverse discrete Fourier transform, DFT of HEQ(f,t):

$$heq(t)=IDFT(HEQ(f,t)),$$

where IDFT denotes the inverse digital (or discrete) Fourier transform and heq(t) is the vector of filter coefficients at time t.

The equalization filter may be implemented as a FIR filter with time varying filter coefficients and may receive heq(t) as its coefficients.

In another example, corresponding to the above example, the equalization filter may be implemented using a fast Fourier Transform, FFT, based convolution, for example according to the overlap-add or overlap-save principles:

$$X1(f,t)=DFT(xb2(t))$$

$$Y(f,t)=DFT(heq(t))*X1(f,t)$$

$$yb(t)=IDFT(Y(f,t))$$

where DFT and IDFT denotes the digital Fourier transform and inverse digital Fourier transform, respectively, taken under the constraints of the overlap-add or overlap-save principles, xb2(t) denotes a block (vector) of samples of the second audio signal taken at time t, yb(t) denotes a block at time t of the output audio signal.

Alternatively, the equalization may be implemented using fast FFT based convolution for example according to the overlap-add or overlap-save principles, see below. The equalization filter may use the HEQ(f,t) directly as its filter coefficients:

$$Y(f,t)=HEQ(f,t)*X1(f,t).$$

In a further example, the filter coefficients are determined as in any of the examples above, and where the signal processor 18 estimates an averaged cross power spectrum of the first and second audio signals under the condition of voice activity detection:

$$S12(f,t)=(\beta*S12(f,t-T)+(1-\beta)*X1(f,t)*conj(X2(f,t))) \text{ if } vad(t), S12(f,t-T) \text{ if not } vad(t)$$

where $X1(f,t)$ and $X2(f,t)$ are the instantaneous spectra of the first and second audio signals, respectively, and conj( ) denotes complex conjugation.

The equalization transfer function HEQ(f,t) may then be generated as follows:

$$HEQ(f,t)=S12(f,t)/S22(f,t)*H_{target}(f).$$

Alternatively, the equalization transfer function HEQ(f,T) may be generated as $$HEQ(f,t)=abs(S12(f,t)/S22(f,t))*H_{target}(f)$$

where abs( ) denotes the absolute value, and for each of the transfer functions the equalization filter coefficients may be generated as mentioned above.

In a further example, the signal processor may 18 may estimate the instantaneous power spectra $P_1(f,t)$ and $P_Y(f,t)$ of the first audio signal and the output audio signal, respectively. The equalization transfer response may be generated as follows:

$$HEQ(f,t)=HEQ(f,t-T) \text{ if not } vad(t), HEQ(f,t-T)+u_1 \text{ if } (vad(t) \text{ and }$$

$$P_1(f,t)>P_Y(f,t)), HEQ(f,t-T)-u_2 \text{ if } (vadt) \text{ and } P_1(f,t)<=P_Y(f,t)),$$

wherein $u_1$ and $u_2$ are adaptation step sizes. The initial HEQ is taken as:

$$HEQ(f,0)=H_{target}(f)$$

Alternatively, the signal processor 18 may estimate the instantaneous power spectra $P_1(f,t)$ and $P_Y(f,t)$ of the first audio signal and the output audio signal, respectively. The equalization transfer response may then be generated as follows:

$$HEQ(f,t)=HEQ(f,t-T) \text{ if not } vad(t), HEQ(f,t-T)+c_1 \text{ if } (vad(t) \text{ and } P_1(f,t)>P_Y(f,t)), HEQ(f,t-T)/c_2 \text{ if } (vadt) \text{ and } P_1(f,t)<=P_Y(f,t)),$$

wherein $c_1$ and $c_2$ are adaptation step sizes.

In a still further example, the equalization filter may implement a finite set of different transfer frequency responses H(f,k) and the signal processor may choose from this set so as to minimize a cost function.

$$Cost(k,t)=sum(W(f)*(H(f,k)-HEQ(f,t)) \quad \text{for} \quad f=f \min \ldots f \max$$

In another example, the adaptation block may implement a standard LMS adaptation scheme.

$$e(t)=x1(b)-y(t)$$

$$heq(t+T)=heq(t)+u*e(t)*xb2(t) \text{ if } vad(t), heq(t) \text{ if not } vad(t)$$

wherein u is the adaptation step size and xb2(t) is a block/vector of samples of the second audio signal taken at time t.

The equalization filter may be implemented as a FIR filter and may receive heq(t) as its coefficients.

Alternatively, the adaptation may follow an NLMS algorithm (normalized LMS):

$$heq(t+T)=heq(t)+u*e(t)*xb2(t)/p_2(t) \text{ if } vad(t), heq(t) \text{ if not } vad(t),$$

wherein $p_2(t)$ is the power of the second audio signal at time t measured with predetermined time constant.

As another alternative, the LMS algorithm may be performed in the frequency domain.

Figure 9:
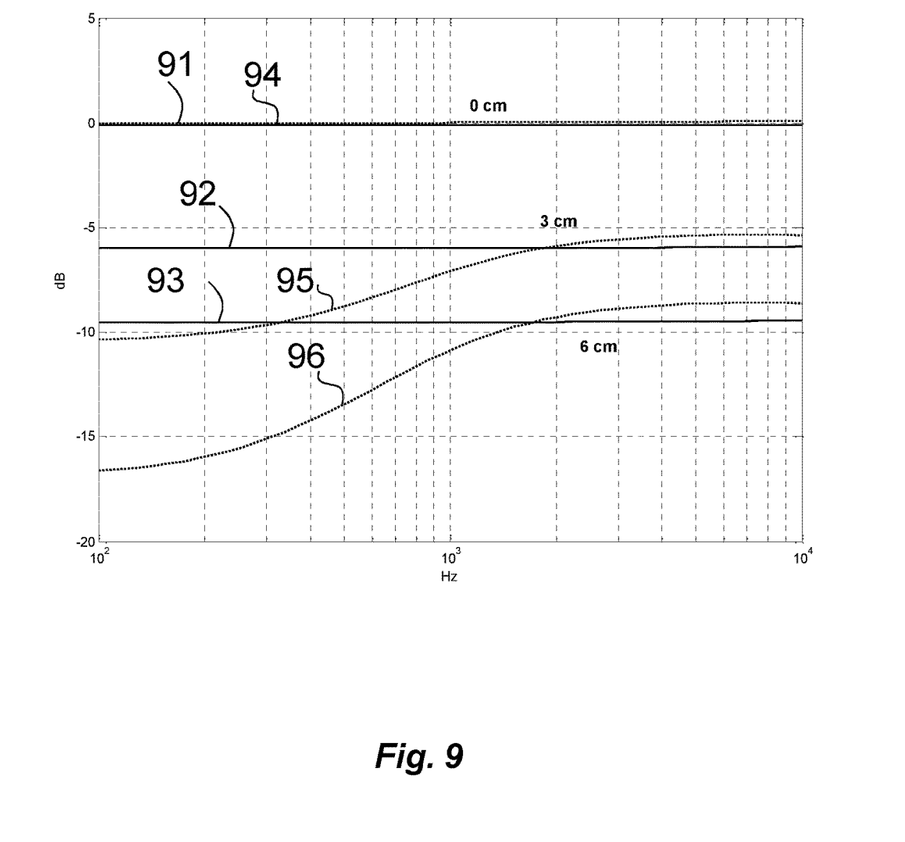
FIG. 9 shows sensitivity of the microphones dependent on microphone configuration and positioning.

FIG. 9 shows simulations of the sensitivity of a headset having a microphone boom which is designed to be optimally placed at the optimum microphone position (which may be referred to as the mouth reference point, MRP. The simulations have been performed with two different microphone configurations, the solid curves are simulated with a standard noise cancelling microphone at the optimum microphone position, curve 91, at a position 3 cm off the optimum microphone position, curve 92, and at a position 6 cm off the optimum microphone position, curve 93. The dashed curves are simulated with two omnidirectional microphones and DSP processing according to the present invention, the two omnidirectional microphones being spaced with 7.5 mm. The curve 94 shows sensitivity when the microphones are optimally positioned, the curve 95 shows sensitivity 3 cm away from the optimum position and the dotted curves shows sensitivity 6 cm away from the optimum position, and it is seen that the conventional noise cancelling microphone loses sensitivity, especially at lower frequencies, whereas the simulations of a headset according to the present invention exhibits almost constant sensitivity, such as having a sensitivity varying less than 1 dB over the frequency spectrum of $10^2$-$10^4$.

Although particular embodiments of the present inventions have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

LIST OF REFERENCES 1 headset
2 headphone
3 headband
4 microphone boom
5 user
6 acoustic source/mouth
7 microphone boom
8 user's ear
9 ear cushion
10 head of user
11 pickup area
12 headphone hub
13 center axis
14 first acoustic pick-up/first microphone opening
15 second acoustic pick-up/second microphone opening
16 first microphone
17 second microphone
18 signal processor
19 equalizer
20 speaker
21 first audio signal
22 second audio signal
23 Heq(f)
24 output audio signal
25 first input port
26 second input port
27 VAD
28 VAD signal
29 microphone unit
30 first microphone
31 second microphone
32 first microphone signal
33 second microphone signal
34 first microphone
35 second beam former
36 first A/D converter
37 second A/D converter
38 gain
39 n'th microphone
40 noise cancelled microphone
41 equalizer output signal
42 adaptive feedback

The invention claimed is:

1. A headset for voice communication of a wearer of the head set comprising:
multiple microphones at least one of which is user positionable, the headset being configured to reduce background noise where the user has mis-positioned at least one microphone by placing it in a sub-optimal position thereby allowing that microphone to pick up additional background noise
which is then transmitted from the headset, said headset having multiple microphones and at least one beam former, the headset including
a speaker,
a microphone unit comprising at least a first and a second microphone for picking up incoming sound and generating a first audio signal generated at least partly from the at least first microphone and a second audio signal being at least partly generated from the at least second microphone, at least one of said microphones being movable and located on a moveable boom whose position is user selectable and hence not necessarily in an optimal position for noise cancellation;
a signal processor used for creating a transmitted audio output voice signal, said signal processor being configured to receive and analyze the first audio signal and the second audio signal, derived from a beam former, to determine one or more equalization filter coefficients,
an equalization filter for reducing the noise in the voice signal transmitted configured to receive the second audio signal and the one or more equalization coefficients, and to equalize the second audio signal from the first audio signal so as to approximate a power spectrum of an output audio signal to a power spectrum of the first audio signal, according to the determined one or more equalization filter coefficients to provide an output audio signal,
wherein the one or more equalization filter coefficient are determined so as to approximate a power spectrum of the output audio signal to a power spectrum of the first audio signal, in order to reduce background noise which is transmitted from the headset regardless of where the boom is positioned by the user and
further including voice activity detector configured to detect when a user is speaking.

2. A headset according to claim 1, wherein the one or more equalization filter coefficients are determined so that a ratio of the power spectrum of the output audio signal and the power spectrum of the first audio signal approximates a predetermined target ratio.

3. A headset according to claim 1, wherein the one or more equalization filter coefficients are determined from a transfer function, $H_{eq}(f)=S_{12}(f)/S_{22}(f)$, wherein $S_{12}$ denotes a cross-correlation spectrum of the first and second audio signals, and $S_{22}$ denotes the autocorrelation spectrum of the second audio signal.

4. A headset according to claim 1, wherein the headset further comprises a microphone boom having at least two microphone openings and connecting the at least two microphone openings to the at least first and second microphones.

5. A headset according to claim 1 wherein the second microphone is a noise cancelling microphone.

6. A headset according to claim 4, wherein first and/or second microphones are provided separately in the microphone boom.

7. A headset according to claim 1, wherein the headset comprises a headphone and wherein the signal processor is provided in the headphone.

8. A headset according to claim 1, further comprising a voice activity detector configured to detect when a user is speaking.

9. A headset according to claim 8, wherein the signal processor is configured to analyze the first and second audio signals when a user is speaking.

10. A headset according to claim 1, wherein the equalization filter applies a frequency dependent gain to the second audio signal.

11. A headset according to claim 1, wherein the first audio signal is generated as a weighted sum of audio signals from a plurality of microphones.

12. A headset according to claim 1, wherein the microphone unit comprises at least a first and a second microphone, and wherein a beam former is configured to receive first and/or second microphone output signals and output a first and/or second beam formed signal, respectively.

13. A headset according to claim 1, wherein the first microphone exhibits an omnidirectional frequency response, and/or wherein the second microphone exhibits a noise-cancelled frequency response.

14. A method of improving audio sensitivity for a headset and for reducing the background noise in a voice signal transmitted from the headset, the headset comprising a headphone and a microphone unit comprising at least a first and a second microphone, said second microphone being user positionable, and at least one beam former, the method comprising;
    allowing the user to move at least one of said microphone on a moveable boom whose position is user selectable and hence not known to be an optimal position for noise cancellation;
    generating at least first and second audio signals from the at least first and second microphones;
    processing the first and second audio signals using at least one beam former, so as to approximate a power spectrum of an output audio signal to a power spectrum of the first audio signal;
    receiving an acoustic signal by the at least first and second microphones,
    generating a first audio signal and a second audio signal derived from the at least first and second microphones,
    analyzing the first and second audio signals to determine one or more equalization filter coefficients,
    equalizing the second audio signal according to the determined one or more equalization filter coefficients to provide an output audio signal, wherein the one or more equalization filter coefficients are determined so as to approximate a power spectrum of the transmitted output audio signal to a power spectrum of the first audio signal, in order to reduce background noise which is transmitted from the headset, regardless of where the boom is positioned by the user to detect when a user is speaking.

15. A method according to claim 14, wherein the one or more equalization filter coefficients are determined so as to approximate a power spectrum of the output audio signal to a power spectrum of the first audio signal.

16. A method according to claim 14, wherein the step of analyzing the first and second audio signals comprises a transformation of the first and second audio signals to the frequency domain, determining an equalization function $H_{eq}(f)$ by analyzing the first audio signal and the second audio signal in a signal processor,
    and deriving the equalization function as $H_{eq}(f)=S_{12}(f)/S_{22}(f)$, wherein $S_{12}$ denotes a cross-correlation spectrum of the first and second audio signals, and $S_{22}$ denotes the autocorrelation spectrum of the second audio signal.

17. A headset for voice communication having multiple microphones at least one of which is user positionable, configured to reduce background noise which is transmitted from the headset, the headset having at least two microphones at least one of said microphone being movable and located on a moveable boom whose position is user selectable and hence not in a known optimal position for noise cancellation and at least one beam former, comprising
    a speaker,
    a microphone unit comprising at least a first and a second microphone for picking up incoming sound and generating a first audio signal generated at least partly from the at least first microphone and a second audio signal being at least partly generated from the at least second microphone,
    a signal processor used for creating a transmitted audio output voice signal, said signal processor, including at least one beam former, being configured to receive and analyze the first audio signal and the second audio signal to determine one or more equalization filter coefficients,
    an equalization filter for reducing the background noise in the voice signal transmitted configured to receive the second audio signal and the one or more equalization coefficients, and to equalize the second audio signal from the first audio signal so as to approximate a power spectrum of the output audio signal to a power spectrum of the first audio signal, according to the determined one or more equalization filter coefficients to provide an output audio signal,
    wherein the one or more equalization filter coefficient are determined so as to approximate a power spectrum of the output audio signal to a power spectrum of the first audio signal and further including voice activity detector configured to detect when a user is speaking, regardless of where the boom is positioned by the user.

* * * * *